US012675299B2

(12) United States Patent
Zang et al.

(10) Patent No.: US 12,675,299 B2
(45) Date of Patent: Jul. 7, 2026

(54) SYSTEM AND METHOD TO BOOT A PCIe ENDPOINT FROM BOOT SOFTWARE STORED IN MEMORY OF A PCIe ROOT COMPLEX

(71) Applicant: NXP B.V., Eindhoven (NL)

(72) Inventors: Tiefei Zang, Austin, TX (US); Gang Liu, Suzhou (CN)

(73) Assignee: NXP B.V., Eindhoven (NL)

( * ) Notice: Subject to any disclaimer, the term of this patent is extended or adjusted under 35 U.S.C. 154(b) by 110 days.

(21) Appl. No.: 18/899,561

(22) Filed: Sep. 27, 2024

(65) Prior Publication Data

US 2026/0079718 A1 Mar. 19, 2026

(30) Foreign Application Priority Data

Sep. 19, 2024 (CN) .......................... 202411307946.2

(51) Int. Cl.
*G06F 9/4401* (2018.01)

(52) U.S. Cl.
CPC .................................. *G06F 9/4411* (2013.01)

(58) Field of Classification Search
CPC ............................... G06F 13/24; G06F 1/3275
See application file for complete search history.

(56) References Cited

U.S. PATENT DOCUMENTS

| | | | |
|---|---|---|---|
| 9,864,605 B2 | 1/2018 | Sarmah et al. | |
| 10,146,718 B2 | 12/2018 | Nelogal et al. | |
| 10,282,192 B1 | 5/2019 | Ayoub et al. | |
| 10,635,450 B2 | 4/2020 | Lee et al. | |
| 2016/0224097 A1* | 8/2016 | Hirouchi | G06F 1/3275 |
| 2021/0042255 A1* | 2/2021 | Colenbrander | G06F 13/4059 |
| 2021/0263875 A1* | 8/2021 | Lin | G06F 13/4221 |
| 2021/0294772 A1* | 9/2021 | Srivastava | G06F 13/4295 |
| 2022/0132298 A1* | 4/2022 | Shiner | H04W 12/04 |
| 2022/0398207 A1* | 12/2022 | Norrie | G06F 13/4022 |
| 2023/0044609 A1* | 2/2023 | Chang | G06F 3/0664 |

OTHER PUBLICATIONS

NXP Semiconductors, "Loading Boot Loader on LS1046ARDB through PCIe," Application Note, Document No. AN12246, Revision 0, Nov. 2018, 27 pages.
Cao et al., "An FPGA based PCI-E Root Complex Architecture for Standalone SOPCs," 2013 21st Annual International IEEE Symposium on Field-Programmable Custom Computing Machines, 4 pages.

* cited by examiner

*Primary Examiner* — Getente A Yimer

(57) ABSTRACT

Boot of a PCIe EP coupled to a RC by a PCIe bus comprises setting, by the PCIe EP, a program counter of a CPU of the PCIe EP to an address indicative of an address of memory of the RC which stores the boot software to execute. A memory transaction to read, by the PCIe EP via the PCIe bus, a portion of the boot software stored in the address of the memory of the RC which store the boot software is performed followed by receiving by the CPU the portion which is read from the memory of the RC via the PCIe bus and PCIe controller of the EP. The portion is stored by the CPU in an instruction cache of the CPU and the CPU of the PCIe EP executes an instruction of the portion of the boot software that is received.

20 Claims, 4 Drawing Sheets

SYSTEM AND METHOD TO BOOT A PCIe ENDPOINT FROM BOOT SOFTWARE STORED IN MEMORY OF A PCIe ROOT COMPLEX

CROSS-REFERENCE TO RELATED APPLICATIONS

This application claims the priority under 35 U.S.C. § 119 of China patent application no. 202411307946.2, filed on 19 Sep. 2024, the contents of which are incorporated by reference herein.

FIELD OF USE

The present disclosure relates generally to a computer architecture and operation and more particularly, to a system and method to boot a peripheral component interconnect express (PCIe) endpoint from boot software stored in memory of a PCIe root complex (RC).

BACKGROUND

PCIe (peripheral component interconnect express) is a bus standard to connect multiple endpoints such as high speed components to a host in a computing system. The PCIe bus standard defines a standardized hardware and protocol to enable communication between the host and the endpoints also referred to as PCIe endpoints. The hardware includes a root complex (RC) and a PCIe switch which defines the PCIe bus. The RC performs transaction operations with a PCIe endpoint on behalf of a processor (e.g., central processing unit) of the host and the PCIe switch provides a point to point connection between the RC and the PCIe endpoint. Like the RC, the PCIe endpoint is also able to perform transaction operations with the host on behalf of a local CPU of the PCIe endpoint.

BRIEF DESCRIPTION OF THE DRAWINGS

The following detailed description of the preferred embodiments of the present disclosure will be better understood when read in conjunction with the appended drawings.

The present disclosure is illustrated by way of example, and not limited by the accompanying figures, in which like references indicate similar elements.

DETAILED DESCRIPTION

Figure 1:
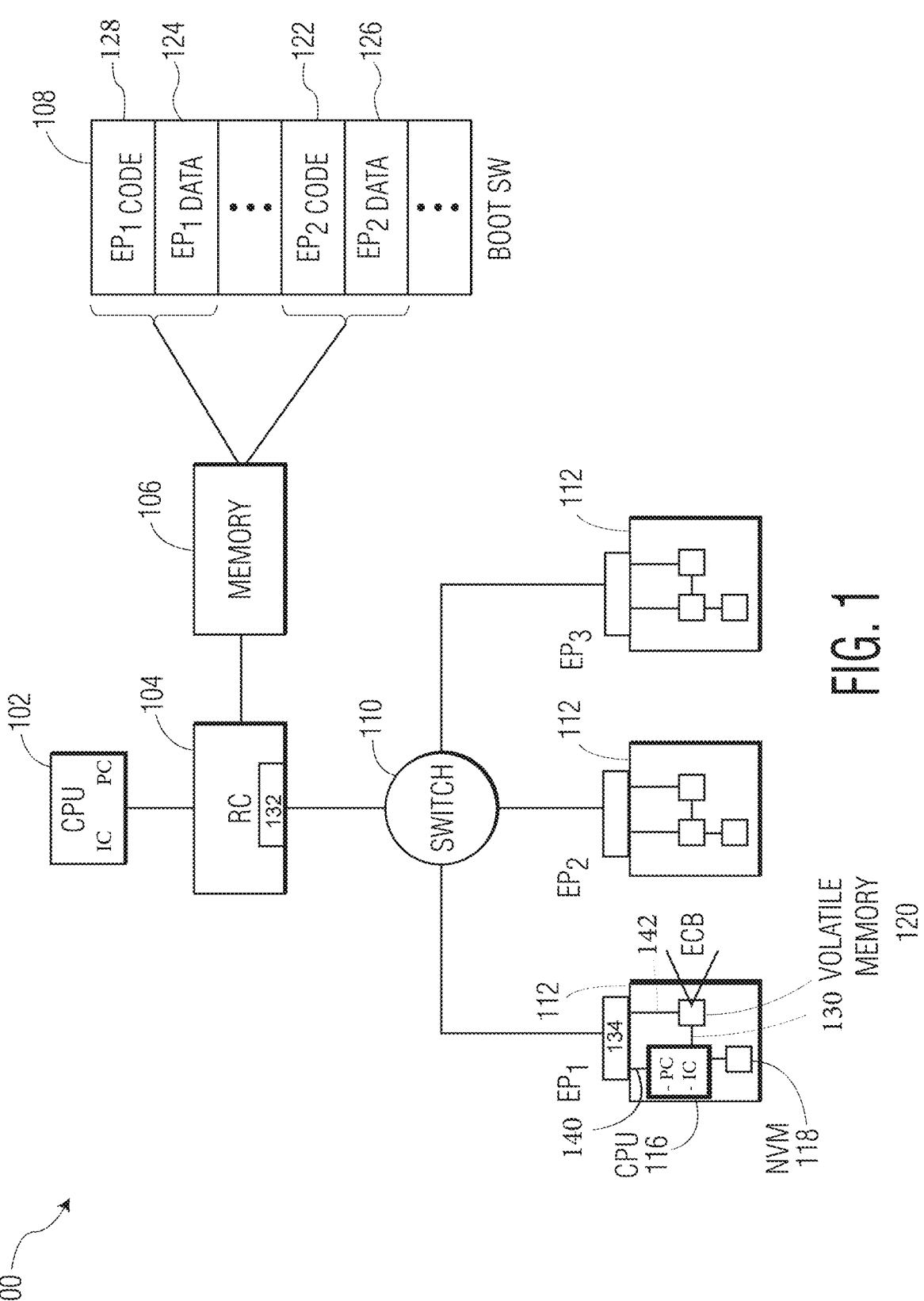
FIG. 1 is an example block diagram of a computing system having a PCIe endpoint (EP) arranged to boot up from boot software resident in a memory of a root complex (RC) in accordance with one or more embodiments.

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

A smart endpoint is a PCIe endpoint (EP) which has a central processing unit (CPU) to execute software to perform functions of the EP and differs from a dummy endpoint like an Ethernet card or sound card which might have dedicated hardware and no software to perform the functions of the EP. The CPU of the EP in the smart EP needs to specifically execute boot software to perform a function of the EP such as graphics processing or network communication and an entirety of the boot software is typically transferred from the root complex (RC) to volatile memory of the EP during a configuration of the EP prior to execution of any instructions of the boot software by the EP. This transfer results in complexity associated with the RC having to manage the boot software on the EP along with increased cost of requiring the EP to have a large volatile memory to store the boot software in its entirety.

One or more embodiments disclosed herein are directed to reducing cost and centralizing management of the boot software which the EP uses to boot up. Boot up of EP is divided into two stages. In a first stage, the CPU of the EP executes configuration software stored locally in a non-volatile memory (NVM) of the EP to define an endpoint configuration block (ECB) stored in a memory of the EP. A centralized EP management module (CEMM) of the root complex (RC) reads parameters of the ECB and loads the boot software of the EP into a volatile memory of the RC from non-volatile memory of the RC or via a network communication based on the parameters of the ECB. Further, the RC updates the ECB to identify a base address and window size in an outbound window of the EP for the EP to fetch the boot software from the volatile memory of the RC. At a second stage, a program counter of the CPU of the EP is set to an outbound window address indicative of an address of the boot software stored in the memory of the RC. The setting of the program counter causes a fetch operation to be performed whereby a portion of the boot software which is stored in the memory of the RC is read and transferred from the RC to an instruction cache of the CPU of the EP via a PCIe bus. The portion is not transferred to the instruction cache by storing the portion from the RC in a memory of the EP coupled to the CPU over a local bus of the EP and the CPU additionally reading or copying the portion in the memory of the EP to transfer the portion to the instruction cache. The CPU of the EP executes the portion and while the portion is executed another portion of the boot software is fetched by the EP and stored the CPU of the EP for execution as another fetch operation. This process is repeated to execute the boot software so that the entire boot software or portion thereof does not need to be stored in a memory of the EP external and accessible to the CPU via the local bus before execution and then transferred to the CPU of the EP for execution. Further, the EP requires less memory and allows for centralized management of the boot up software of the EP by the RC because the entire boot software or portion thereof is not stored in the memory of the EP. Well known instructions, protocols, structures, and techniques have not been shown in detail in order not to obfuscate the description.

FIG. 1 is an example block diagram of a computing system 100 having a plurality of PCIe endpoints (EP) arranged to boot up from boot software resident in a memory of a root complex (RC) in accordance with one or more embodiments. PCIe promulgated by the PCI-SIG (special interest group) Consortium defines an interface to facilitate access to functionality of one or more devices such as a network interface card (NIC), a storage accelerator device, a graphics processor, and other high-performance component referred to as a PCIe endpoint (EP) by a host having a processor such as a central processing unit (CPU). The PCIe interface defines an electrical and protocol for a connection from the host to the EP to access the functionality of the EP. The computing system 100 and associated subsystems described herein may be implemented with circuitry such as one or more of analog circuitry, mix signal circuitry, memory circuitry, logic circuitry, and processing circuitry that executes code stored in a memory that when executed by the processing circuitry performs the disclosed functions.

In one or more examples, the computing system 100 includes one or more of a central processing unit (CPU) 102, one or more PCIe (peripheral component interconnect express) EP 112 (also referred to as EP 112), a PCIe switch 110, and a root complex 104. The CPU 102 may perform various compute functions by executing software and the RC 104 defines an input/output (I/O) hierarchy to facilitate communication between the CPU 102 and the PCIe EP 112 via the PCIe switch 110. In one or more examples, the CPU 102 (and similarly CPU 116) may have respective program counters (PC) to indicate an address of an instruction stored in a memory to be executed. The PCIe switch 110 defines a physical point-to-point connection between the RC 104 and the PCIe EP 112 which is referred to as a PCIe bus. In one or more examples, the RC 104 may be coupled to the CPU 102 by a local bus. Further, the RC 104 may have a memory 106 coupled to the RC 104 by a local bus and include one or more of volatile memory or non-volatile memory. The memory 106 may be several Gigabytes in size in one or more examples. The PCIe EP 112 may each be a PCIe device such as the network interface card (NIC), storage accelerator device, or other high-performance component. In one or more examples, the EP 112 is a smart EP which include a CPU 116 which executes software to perform functions of the EP 112 and memory shown as non-volatile memory 118 such as electronically erasable programable read only memory (EEPROM) and volatile memory 120 accessible and external to the CPU 116 such as static random access memory (SRAM) via a respective local bus of the EP 112. The memory 120 is distinguishable from any instruction cache (IC) of the CPU 116 which is internal to the CPU 116 or an internal SRAM or any buffer of a PCIe controller 134. The PCIe controller may facilitate exchange of data (e.g., instructions) between the PCIe bus and CPU 116 by local bus 140 and between the PCIe bus and memory 120 by local bus 142. The EP 112 is not a dummy EP such as a typical Ethernet card or sound card which has dedicated hardware for performing its functions and does not have a CPU and software to execute by the CPU.

The computing system 100 is illustrated to have three EP 112. The number of EP is shown as exemplary and the computing system 100 may have more or less EPs. Further, components and architecture for the EPs may be the same as illustrated or different.

The CPU 116 of the EP 112 needs boot software to execute the functions of the EP 112. The boot software is typically transferred in its entirety from the memory 106 which is large enough to store the boot software to the memory 120 of the EP during a configuration of the computing system 100 prior to the execution of any instructions of the boot software by the CPU 116. In this case, the memory 120 needs to be large enough to store the boot code in its entirety. Storing the boot software in the memory 120 also results in complexity associated with the RC having to manage the boot software on the EP. The RC 102 may need to access the boot software from the memory 106 and store an entire image of the boot software in the memory 120 of the EP 112 or download the boot software from a remote location such as an over the air access (OTA) and store an entire image of the boot software in the memory 120 of the EP 112.

One or more embodiments disclosed herein are directed to reducing cost of the EP 112 and centralizing management of boot software of the EP 112. Bootup of the EP 112 is a process of executing software of an operating system which manages memory and processes of the EP 112 after reset of the EP 112. The operating system may be defined by the bootup software stored in the memory 106. The CPU 116 performs a fetch of instructions of the bootup software to be executed. In response to the fetch, the EP 112 performs a memory transaction to read a portion of the boot software stored in the memory 106 which is then received by the CPU 116 from the RC 104 via the PCIe bus, PCIe controller 134, and local bus 140 and stored in an instruction cache (IC) of the CPU 116. The portion is one or more instructions which is/are stored in an instruction cache of CPU 116 of the PCIe EP for execution by the CPU 116. Further, fetching is a process where the CPU 116 obtains a portion of the boot software stored the memory of the RC 106 directly from the RC 106 via a PCIe bus, PCIe controller 134, and local bus 140 rather than being transferred from the PCIe controller 134 to the memory 120 via the PCI controller 134 and local bus 142 and then transferred via the local bus 130 to the CPU 116 for storage in an instruction cache of the CPU 116 for execution. In one or more examples, the portion is not transferred to the instruction cache by storing the portion from the RC 104 in the memory 120 coupled to the CPU 116 and the CPU 116 additionally reading or copying the portion in the memory 120 of the EP 112 to transfer the portion to the instruction cache. Further, the boot software is not stored in its entirety or portion thereof in the volatile memory 120 of the EP 112 or non-volatile memory 118 of the EP 112 before execution and then transferred by the CPU 116 to its instruction cache via the local bus 130 for execution. While the portion is being executed an additional portion of the boot software is fetched for execution by memory transactions initiated by the EP 112 to the RC 104. This process of fetching followed by execution by the CPU 116 is repeated so that the entire boot software or portion thereof does not need to be stored at once in the memory 120 of the EP 112 saving the expense of needing a large memory 120 and having the RC 104 to initiate transfer of the boot code. The memory 120 may only need to be several kilobytes in size in one or more examples.

The process of transferring and executing the boot software is performed in two stages.

At a first stage, the CPU 116 executes configuration software stored locally in the non-volatile memory 118 of the EP 112 to configure an endpoint configuration block (ECB) stored in the memory 120 of the EP 112. The configuration software may be different from the boot software in that it has a small footprint in the NVM 118 which is less than a footprint of the boot software resident in the memory 106 and does not perform functions of the operating system of the EP 112. The ECB may be stored in a memory region of the volatile memory 120 which is identified by a base addressable register (BAR) of the EP 112. The memory region is a subset of memory locations in the memory 120. The BAR is a small 32-bit memory location accessible to the RC 104 that points to a usually much larger memory region in the EP 112 and indicates a base address and width of the memory region. The EP 112 may have a plurality of BAR (referred to as BAR0 to BAR5) corresponding to different memory regions in the memory 120. The ECB defines parameters to allow the EP 112 to access the boot software for the EP in the memory 106. A centralized EP management module (CEMM) of the RC 104 obtains the parameters of the ECB by accessing the ECB based on the BAR and loading the boot software of the EP into the memory 106 of the RC 102 based on the parameters. For example, based on the parameters of the ECB, the RC 104 may obtain the boot software specific for the EP 112 from non-volatile memory of the memory 106 and store in the volatile memory of the memory 106 or download the boot software for the EP 112 from a remote location and store the boot software in the memory 106. The boot software may be stored in a memory region of the memory 106 of the RC 104 that is indicated by an inbound window of the RC 104. In one or more examples, each EP 112 may have corresponding boot software such that EP1 may have boot software 128 and another EP2 may have boot software 122 stored in different memory regions of the memory 106 each defined by a respective inbound window. The RC 104 may also define a data region for each EP 112 such as data region 124, 126 for EP1 and EP2, respectively, to store data associated with execution of the boot software. In some examples, the RC 104 may store same boot software for different EP 112 such as when the hardware of the different EP 112 is the same and the EPs perform a same function. The RC 104 may update the ECB of the EP 112 to allow the CPU 116 of the EP 112 to access the boot software stored in the memory region of the memory 106 of the RC 104 defined by an inbound window of the RC 104. In one or more examples, the boot software may be further resident in the memory 106, meaning that the memory 120 of the EP 112 does not store an entirety of or portion of the boot software.

At a second stage, the EP 112 may perform a transaction such as a fetch operation in the memory region of the memory 106 defined by an inbound window of the RC 104 to execute the stored boot software based on the parameters of the ECB written by the RC 104. The CPU 116 may update its program counter to indicate an address of the instruction to execute. The setting of the program counter causes the fetch operation to be performed whereby a portion of the boot software which is stored in the memory of the RC is read and transferred from the RC to an instruction cache of the CPU 116 for storage via the PCIe bus, local bus 140, and PCIe controller 134 and not via the PCI controller 134, local bus 142, memory 120, and local bus 130. The instruction of the portion of the boot software which is fetched is then executed. While the instructions are being executed, the CPU 116 may perform another fetch operation to receive another portion of the boot software stored in the memory 106 by further updating the program counter with an address of another instruction to execute. This process of fetching followed by execution of portions of the boot software is repeated to execute the boot software so that the entire boot software does not need to be stored at once in the memory 120 of the EP 112 before execution or portions of the boot software do not need to be stored in the memory 120 and then additionally read by the CPU 116 or copied by the CPU 116 to the instruction cache of the CPU 116. Further, the portions of the boot software that are fetched at a time is less than the entire boot software and as instructions are executed. The EP 112 requires less memory 120 because the entire boot software does not need to be stored in the EP 112 and allows for centralized management of the boot software of the EP 112 by the RC 104.

In one or more examples, local bus 140, local bus 142, and local bus 130 may be separate local buses in the EP 112 or a same local bus identified by different reference numbers. Embodiments are not limited by the arrangement of communication between the CPU 116, PCIe controller 134, and memory 120.

Figure 2:
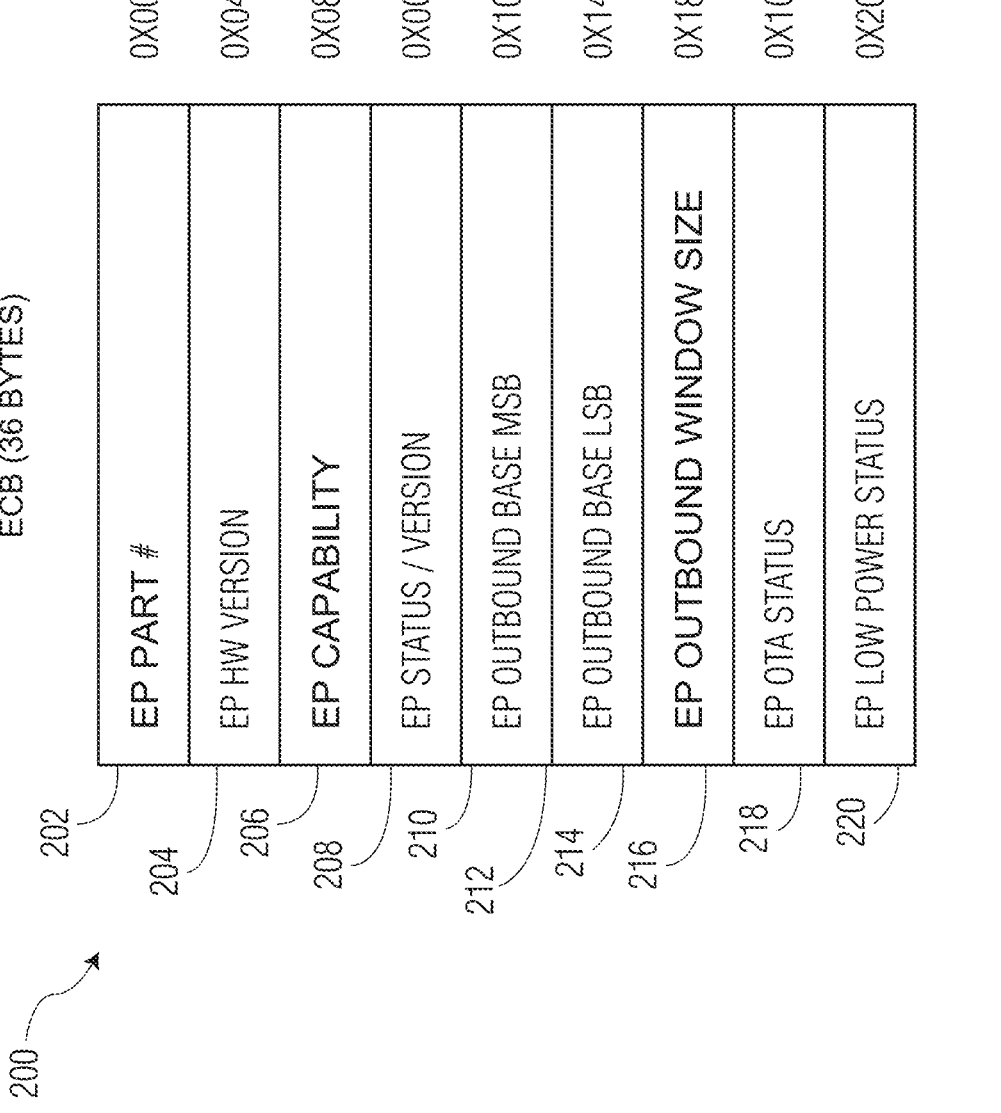
FIG. 2 is an example endpoint configuration block (ECB) stored in memory of the EP in accordance with one or more embodiments.

FIG. 2 is an example endpoint configuration block (ECB) 200 of the EP 112 stored in the memory 120 of the EP 112 in accordance with one or more embodiments. The ECB 200 includes a plurality of fields and is stored in a memory region of the memory 120 defined by a BAR of the EP 112. The ECB 200 in one or more examples may be 36 bytes and include nine four byte fields. The ECB 200 is exemplary in nature and may have fewer or more fields than as described herein.

In one or more examples, the ECB 200 may include one or more of a EP part number field 202 and an EP hardware version field 204 which collectively identify the EP 112, an EP capability field 206 which indicates functions which the EP 112 is able to perform, and an EP status 210 and EP application software version field 210. The EP status 210 may indicate a state of operation of the EP 112 such as the EP 112 awaiting the RC 112 to configure certain fields of the ECB 112 or the configuration of the ECB 112 is complete. The EP version 210 may indicate an application software version, respectively, which is to be executed by the EP 112. The EP 112 may have read and write access to the fields 202-210 while the RC 104 may have read access to the fields 202-210.

An outbound window may be defined in the EP 112 to facilitate access by the EP 112 to memory locations outside of the EP 112. The outbound window specifies a range of addresses and each range of addresses may be associated with access to memory locations of a memory in a respective device in the computing system 100. In one or more examples, an address range identified by a base address and a window size may map to a memory region in the memory 106 defined by an inbound window of the RC 104. Access to the address range identified by the base address and the window size in the range of addresses of the outbound window causes the EP 112 to access the memory region in the memory 106 defined by the inbound window of the RC 104 via the PCIe bus. For example, to enable the CPU 116 to fetch the bootup software stored in the memory 106 of the RC 104, the CPU 116 may indicate by its PC an address in the address range of the outbound window corresponding to the memory 106 of the RC 104 which is translated by a PCIe controller 134 of the EP 112 to a PCIe system address. An inbound window may be defined in the RC 104 to facilitate access by the EP 112 to memory locations in the memory 106 of the RC 104. If a PCIe controller 132 of the RC 104 translates the PCIe system address from the PCIe controller of the EP 112 to an address of the addresses in the inbound window corresponding to the memory region of the memory 106 defined by the inbound window in the RC 104, then the EP 112 is accessing the memory region of the memory 106 where the boot software is stored in the memory 106. The RC 104 may perform a memory transaction such as a read operation on the memory region of the memory 106 defined by the inbound window such as a read of a portion of the boot software. The portion may be provided to the EP 112 via the PCIe bus and stored in the instruction cache of the CPU 102. The portion is not stored in the memory 120 and then additionally read or copied from the memory 120 to the CPU 102. The ECB 200 may have fields 212-214 to indicate a most significant bit (MSB) and least significant bit (LSB) of the base address of the outbound window which are concatenated to form a 64 bit address and a window size 216 of addresses in the outbound window which corresponds to addresses in the inbound window associated with where boot software is stored in a memory region of the memory 106 defined by an inbound window of the RC 104. The EP 112 may have read access to the fields 212-216 which are configured by the RC 104 that has read and write access to the fields.

The ECB 200 may also include an over the air (OTA) status field 218 that indicates whether the boot software in the RC 104 is to be updated or being updated by an OTA server. The EP 112 may trigger the OTA update in one or more examples by writing an indication to the field 218 and the RC 104 may write indications to the field 218 to provide a status of the OTA update such as whether the OTA update is started, reset, or completed by the server and which the EP may read. The EP 112 may have read and write access to this field 218 to trigger the OTA update and read the status of the OTA update. The RC 104 may have read and write access to the field 218 to indicate the OTA update status and determine whether the EP 112 triggered the OTA update. An EP low power status field 220 may indicate whether the EP 112 is a low power mode such as standby or sleep or is in an awake mode. Different modes may consume different levels of power. The EP 112 may have read and write access to the fields 218-220 and the RC 104 may have read access to the fields.

Figure 3:
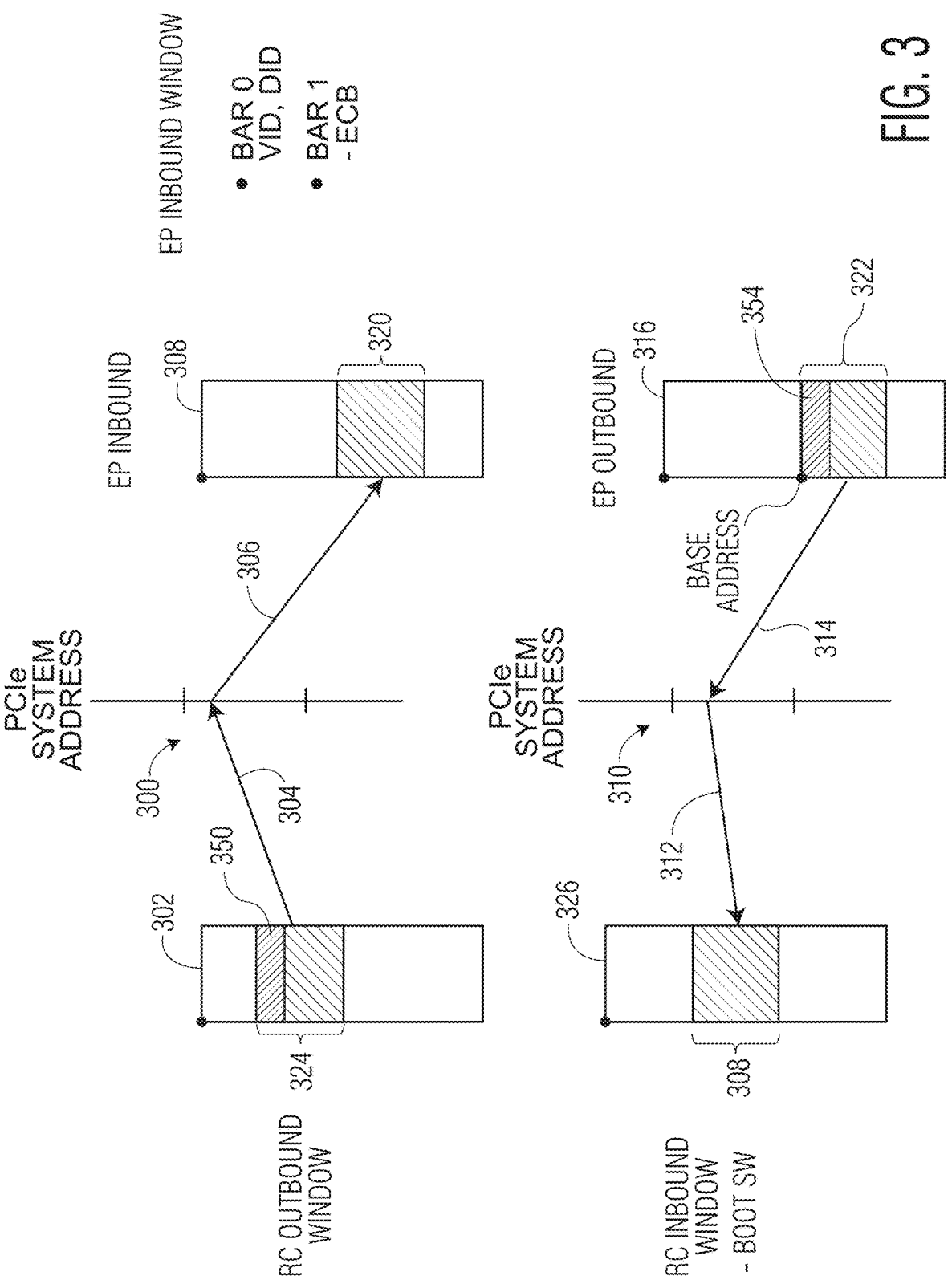
FIG. 3 is an example of operation of outbound and inbound windows of the EP and RC to facilitate performing transactions in the computing system in accordance with one or more embodiments.

FIG. 3 is an example of operation of outbound windows 302, 316 and inbound windows 308, 326 of the EP 112 and RC 104 to facilitate performing memory transactions in the computing system 100 in accordance with one or more embodiments. The memory transactions may be read or write transactions in one or more examples performed by the RC 104 or PCIe EP 112 in one or more examples to access the ECB or read transactions for the CPU 116 to fetch the boot software stored in the memory 106 of the RC 104 in one or more examples.

A window defines addresses to allow an EP 112 to access a memory region in memory of the RC 104 defined by an inbound window of the RC 104 or RC 104 to access a memory region in memory of the EP 112 defined by a BAR of the EP 112. In one or more examples, the EP 112 defines an outbound window 316 with addresses 322 that enable access to a memory region in memory of the RC 104 defined by an inbound window 326 of the RC 104. The addresses 322 may be defined by the MSB and LSB of base address fields 212-214 and window size 216 in the ECB 200. Further, the RC 104 defines the inbound window 326 of the RC 104 with addresses 308 that map to a memory region in memory of the RC 104 defined by the inbound window 326 of the RC 104 that is accessible to the EP 112.

Addresses in the outbound window 316 of the EP 112 which map to addresses in the inbound window 326 may allow the EP 112 to access to boot software located in the memory region of memory 106 defined by an inbound window of the RC 104 based on the addresses 308 in the inbound window. In one or more examples, the RC 104 defines an outbound window 302 with addresses 324 that enable access to a memory region in memory of the EP 112 defined by a BAR of the EP 112. Further, the EP 112 defines an inbound window 308 of the EP 112 with addresses 320 that map to a memory region in the memory 120 of the EP 112 defined by a BAR of the EP 112 that is accessible to the RC 104. The addresses 324 in the outbound window 302 of the RC 104 which map to the addresses 320 in the inbound window 308 may allow the RC 104 to access the ECB of the EP 112 in the memory region of the memory 120 defined by a BAR of the EP 112 based on the addresses 320 in the inbound window 308. The access may include the ECB stored in the memory region defined by BAR1 in the memory 120 of the EP 112 or indication of the vendor ID (VID) or device ID (DID) stored in a memory region of the memory of the EP 112 defined by BAR0 in the memory 120 of the EP 112, among other information.

The RC 104 may perform a memory transaction based on the addresses 324 in the outbound window 302 to read and write to the ECB 200 stored in the memory 120 of the EP 112 and monitor the parameters of the ECB 200. In memory transaction 300, the CPU 102 requests that the RC 104 perform a memory transaction based on an address 350 in the address range 324 of the outbound window 302 of the RC 104. For example, the operation may be to read or write to a memory region of the memory 120 defined by a BAR of the EP 112 based on the address 350. The PCIe controller of the RC 104 may translate the address 350 to a PCIe system address such as a bus/device/function (BDF) number in operation 304. If a PCIe controller of the EP 112 translates the PCIe system address to an address in the address range 320 of the inbound window 308 in operation 306, then the memory transaction requested by the RC 104 may be performed by the EP 112 based on the address to which the PCIe system address translates. The memory operation may be to access the ECB, VID, or DID stored in the memory region of memory 120 based on a BAR of the EP 112 depending on the address in the address range 320 as examples. The RC 104 may perform a write to the ECB or read of the ECB, VID, DID as examples in which case the read data is provided back to the RC 104.

Similarly, the EP 112 may perform memory transactions based on the addresses 322 in the outbound window 316 to read the boot software stored in the memory 106 of the RC 104. In memory transaction 310, the CPU 116 indicates by its PC an address 354 in the address range 322 of the outbound window 316 of the EP 112 and requests that a PCIe controller of the PCIe EP 112 perform a memory transaction based on the address 354. For example, the operation may be to read a memory region of the memory 106 defined by an inbound window 326 of the RC 104 based on the address 354. The PCIe controller of the EP 112 may translate the address 354 in the address range 322 of the outbound window 316 of the EP 112 to a PCIe system address in operation 314. If the PCIe controller of the RC 104 translates the PCIe system address to an address in the address range 308 of the inbound window 326 of the RC 102 in operation 312, then the memory transaction requested by the EP 112 may be performed by the RC 104 based on the address to which the PCIe system address translates. The memory operation may be to access the boot software stored in the memory region of the memory 106 defined by an inbound window of the RC 104 based on the address to which the PCIe system address translates. The RC 104 may read the boot software stored in the memory 106 of the RC 104 and results of the read is provided to CPU 116 of the EP 112 as a fetch operation initiated by the CPU 116 via the PCIe bus. The results of the read which is an instruction of the boot software may not be stored in the memory 120 and read by the CPU 116 or copied by the CPU 116 to its instruction cache, and is instead transferred to the CPU 116, consistent with the fetch operation.

The examples above describe memory operations associated with an address. The address may be indicative of one address to access one memory location in a memory or a plurality of address to access a plurality of memory locations in a memory region.

Figure 4:
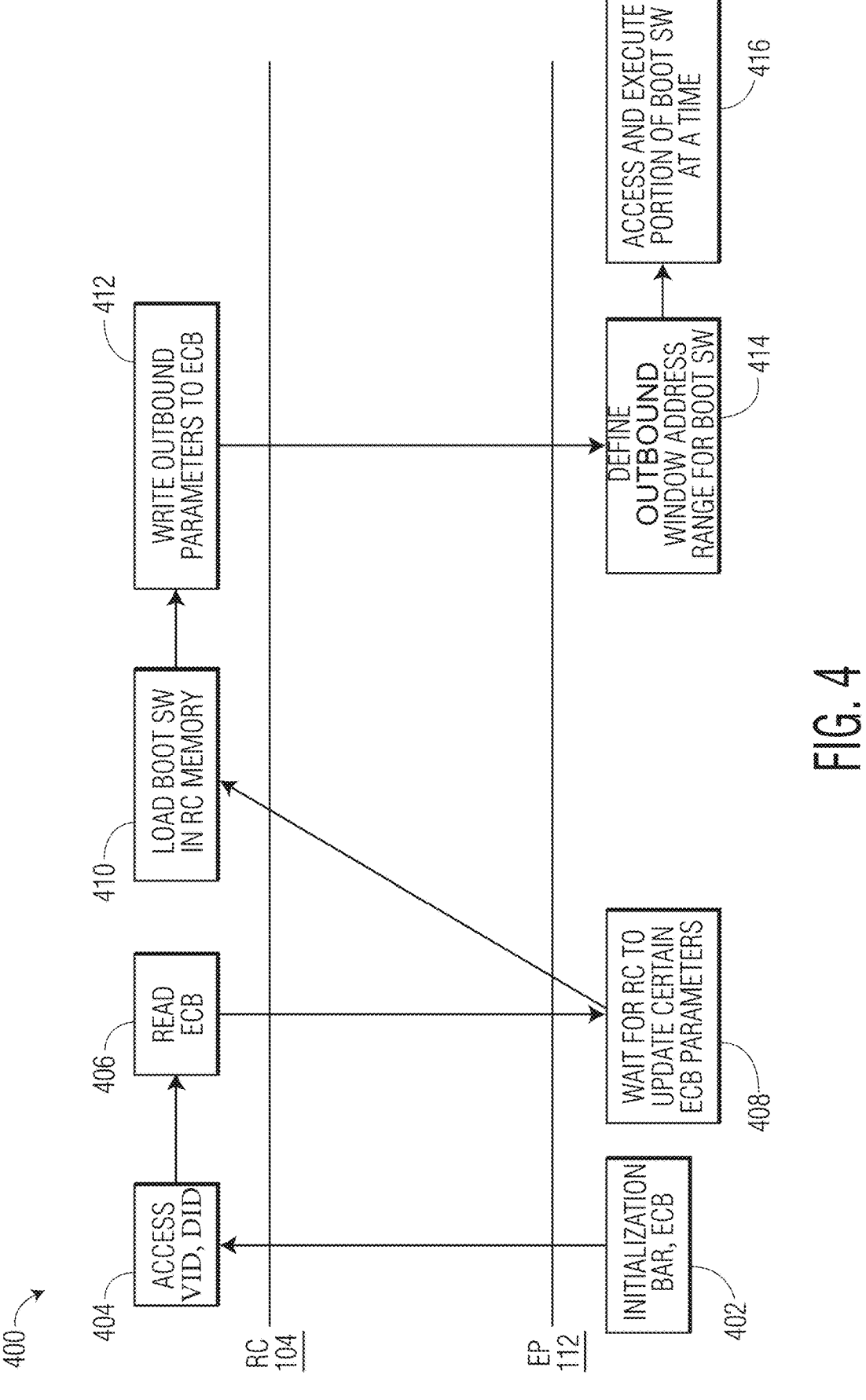
FIG. 4 illustrates an example flow chart of functions associated with operation of the RC and EP in accordance with one or more embodiments.

FIG. 4 illustrates an example flow chart of functions 400 associated with operation of the RC and EP in accordance with one or more embodiments. The functions are performed by the RC 104 and an EP 112 in one or more examples to perform boot up of the EP 112 based on boot software being resident in the memory 106 of the RC 104. The boot up of the EP 112 is performed without having to store an entire image of the boot software or portion thereof in the memory 116 of EP 112 at any one time.

At 402, an EP is coupled to a PCIe interface of a PCIe bus and executes configuration software stored in the non-volatile memory of the EP to initialize one or more BAR and define an ECB. The BAR may be BAR0 which defines a base address and window of a memory region in memory of the EP where the VID and DID of the EP is stored. The BAR may also be BAR1 which defines a base address and window of a memory region in memory of the EP where the ECB is stored by the EP.

At 404, the RC performs a memory transaction to access the memory region defined by BAR0. The RC performs the access to the memory region based on accessing an address in an outbound window of the RC which is translated to a PCIe system address and from the PCIe system address to an address of an inbound window of the EP which corresponds to the address in the memory region defined by BAR0 in memory of the EP. Based on the address in the inbound window, the EP performs a read operation in the memory region defined by BAR0 and provides results of the VID and DID stored in memory of the EP to the RC.

At 406, the RC reads the ECB of the EP. The RC performs the access to a memory region defined by BAR1 in the EP which stores the ECB based on accessing an address in an outbound window which is translated to a PCIe system address and from the PCIe system address to an address of an inbound window of the EP which corresponds to the address in the memory region defined by BAR1 in memory of the EP storing the ECB. Based on the address which is in the inbound window, the EP performs the read operation and provides parameters of the ECB stored in memory of the EP. The parameters may include the EP part number and hardware version.

At 408, the EP waits for the RC to update various parameters of the ECB including the EP outbound base registers and window size which facilitate the PCIe EP to access boot software stored in the memory of the RC.

At 410, the RC parses EP parameters defined by the ECB including the part number and device version in the fields of the ECB and loads boot software of the EP based on the EP parameters in the memory of the RC from non-volatile memory or from a remote location by an OTA access. Further, the RC defines an inbound window having a base address and window size which corresponds to a memory region storing the boot software which is loaded.

At 412, the RC writes outbound parameters to the ECB which the EP is to use to define an outbound window of the EP to access the boot software. The parameters may include an outbound window base address and window size of the outbound window of the EP. Access by the EP to the addresses defined by the outbound window base address and window size translate to an address in an inbound window of the RC mapping to the memory region of the memory of the RC storing the boot software. The write process may include the RC indicating an address in an outbound window of the RC which is translated to a PCIe system address and from the PCIe system address to an address in the inbound window of the EP which corresponds to an address of a memory region in memory defined by a BAR of the EP which stores the ECB. Based on the address which is in the inbound window, the EP performs the write operation and writes parameters of the ECB stored in memory of the EP such as the EP outbound LSB, MSB and window size in respective fields of the ECB.

At 414, the EP defines an address range in an outbound window based on the base address and window size indicated by the updated ECB. An address of the outbound window may correspond via a PCIe system address to an address in the memory region defined by an inbound window of the RC which stores the boot software of the EP. Further, the EP may sets the ECB low power status parameter of the ECB to running.

At 416, the EP then performs a memory transaction to read a portion of the boot software stored by the RC. The CPU of the EP may have a program counter which is a register to keep track of memory addresses of instructions to be executed. The program counter is set to an address in the outbound window of the EP associated with the boot software to fetch a portion of the boot software indicated by the address for execution. The EP then performs a memory transaction to access the portion of the boot software by the PCIe controller of the EP translating the address in the outbound window of the EP to a PCIe system address and the PCIe controller of the RC translating the PCIe system address to an address of an inbound window of the RC which corresponds to an address of the portion of boot software stored in a memory region of the memory defined by an inbound window of the RC. The portion of the boot software which is stored in the memory of the RC is read and transferred from the RC to an instruction cache in the CPU of the EP for storage via a PCIe bus and PCIe controller 134 of the EP and not via the PCIe controller 134 and memory 120. The portion is not stored in the memory 120 and then read by the CPU 116 or copied by the CPU 102 to the instruction cache of the CPU 116. While the instructions are being executed, a transfer of another portion of the boot software is also performed which replaces the instructions currently being executed in the instruction cache and the transferred portion is executed. This process repeated to execute the boot software resident in the memory of the RC. Instead of the RC having to store the entire boot software of the EP locally in the volatile memory 120 of the EP or portion thereof before the boot software is executed during an EP configuration process, the boot software is stored in the memory 106 of the RC and portions transferred as needed to the PCIe EP by a plurality of memory transactions initiated by the EP to the RC to the CPU 116 directly. The entire boot software does not need to be stored in the memory 120 of the EP at any one time saving on size and cost of the memory 120 of the EP.

In an embodiment, a method for boot of a PCIe (peripheral component interconnect express) endpoint (EP) coupled to a root complex (RC) by a PCIe bus is disclosed. The method includes: setting, by the PCIe EP, a program counter of a central processing unit (CPU) of the PCIe EP to an address indicative of an address in memory of the RC which stores the boot software to execute; performing a memory transaction to read, by the PCIe EP via the PCIe bus, a portion of the boot software stored in the address of memory of the RC which stores the boot software; receiving, by the CPU, the portion of the boot software which is read from the memory of the RC via the PCIe bus and PCIe controller of the EP; storing, by the CPU, the portion in an instruction cache of the CPU; and executing, by the CPU of the PCIe EP, an instruction of the portion of the boot software that is received. In an example, the address indicative of the address in the memory of the RC which stores the boot software is defined by an outbound window of the EP comprising addresses that correspond to a memory region of the memory which stores the boot software, the memory region defined by an inbound window of the RC. In an example, an EP configuration block (ECB) stored in memory of the EP defines addresses of the outbound window that correspond to the memory region of the memory of the RC which stores the boot software, the ECB accessible to the RC by a base address register (BAR) of the EP. In an example, the ECB further defines an EP over the air (OTA) update status field, the method further comprising the EP indicating to the RC to perform an OTA update of the boot software via the field. In an example, the method further includes executing, by the PCIe EP, configuration software to set up the ECB in the memory of the EP after reset of the EP. In an example, the RC writes a base address and window size of the addresses to the ECB in the memory of the EP after storing the boot software in a volatile memory of the memory of the RC. In an example, the method further includes determining, by the RC, an address in an inbound window of the RC which corresponds to the address of the addresses in the outbound window of the EP and a memory region of the memory of the RC which stores the boot software; and accessing the address in the inbound window of the RC to read the portion of the boot software in the memory region. In an example, the portion is not stored in a memory of the EP outside of the PCIe controller of the EP and then transferred to the instruction cache. In an example, the portion is not copied by the CPU or read by the CPU from a memory of the EP outside of the PCIe controller of the EP to the instruction cache. In an example, the EP does not store an entirety of the boot software during execution of the portion.

In another embodiment, a system is disclosed. The system includes a PCIe bus; a root complex (RC); a PCIe endpoint (EP); wherein the RC and EP are in communication via the PCI bus; wherein the EP is arranged to set a program counter of a central processing unit (CPU) of the PCIe EP to an address indicative of an address of memory of the RC which stores the boot software to execute; perform a memory transaction via the PCIe bus to read a portion of the boot software stored in the address of the memory of the RC which stores the boot software; receive, by the CPU, the portion which is read from the memory of the RC via the PCIe bus and PCIe controller of the EP, store, by the CPU, the portion in an instruction cache of the CPU; and execute, by the CPU of the PCIe EP, an instruction of the portion of the boot software that is received. In an example, the address indicative of the address in the memory of the RC which stores the boot software is defined by an outbound window of the EP comprising addresses that correspond to a memory region of the memory of the RC which stores the boot software, the memory region defined by an inbound window of the RC. In an example, an EP configuration block (ECB) stored in memory of the EP defines addresses of the outbound window that correspond to the memory region of memory of the RC which stores the boot software, the ECB accessible to the RC by a base address register (BAR) of the EP. In an example, the ECB further defines an EP over the air (OTA) update status field for the EP to indicate to the RC to perform an OTA update of the boot software via the field. In an example, the PCIe EP is further arranged to execute configuration software to set up the ECB in the memory of the EP after reset of the EP. In an example, the RC is arranged to write a base address and window size of the addresses to the ECB after storing the boot software in a volatile memory of the memory of the RC. In an example, the RC is arranged to determine an address in an inbound window of the RC which corresponds to the address of the addresses in the outbound window of the EP and the memory region of the memory of the RC which stores the boot software; and access the address in the inbound window of the RC to read the portion of the boot software in the memory region. In an example, the portion is not stored in a memory of the EP outside of the PCIe controller of the EP and then transferred to the instruction cache. In an example, the portion is not copied by the CPU or read by the CPU from a memory of the EP outside of the PCIe controller of the EP to the instruction cache. In an example, the EP does not store an entirety of the boot software during execution of the portion.

A few implementations have been described in detail above, and various modifications are possible. The disclosed subject matter, including the operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a computer to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Other implementations fall within the scope of the following claims.

What is claimed is:

1. A method for boot of a PCIe (peripheral component interconnect express) endpoint (EP) coupled to a root complex (RC) by a PCIe bus, the method comprising:

setting, by the PCIe EP, a program counter of a central processing unit (CPU) of the PCIe EP to an address indicative of an address in memory of the RC which stores the boot software to execute;

performing a memory transaction to read, by the PCIe EP via the PCIe bus, a portion of the boot software stored in the address of memory of the RC which stores the boot software;

receiving, by the CPU, the portion of the boot software which is read from the memory of the RC via the PCIe bus and PCIe controller of the EP;

storing, by the CPU, the portion in an instruction cache of the CPU; and executing, by the CPU of the PCIe EP, an instruction of the portion of the boot software that is received.

2. The method of claim 1, wherein the address indicative of the address in the memory of the RC which stores the boot software is defined by an outbound window of the EP comprising addresses that correspond to a memory region of the memory which stores the boot software, the memory region defined by an inbound window of the RC.

3. The method of claim 2, wherein an EP configuration block (ECB) stored in memory of the EP defines addresses of the outbound window that correspond to the memory region of the memory of the RC which stores the boot software, the ECB accessible to the RC by a base address register (BAR) of the EP.

4. The method of claim 3, wherein the ECB further defines an EP over the air (OTA) update status field, the method further comprising the EP indicating to the RC to perform an OTA update of the boot software via the field.

5. The method of claim 3, further comprising executing, by the PCIe EP, configuration software to set up the ECB in the memory of the EP after reset of the EP.

6. The method of claim 3, wherein the RC writes a base address and window size of the addresses to the ECB in the memory of the EP after storing the boot software in a volatile memory of the memory of the RC.

7. The method of claim 2, further comprising determining, by the RC, an address in an inbound window of the RC which corresponds to the address of the addresses in the outbound window of the EP and a memory region of the memory of the RC which stores the boot software; and accessing the address in the inbound window of the RC to read the portion of the boot software in the memory region.

8. The method of claim 1, wherein the portion is not stored in a memory of the EP outside of the PCIe controller of the EP and then transferred to the instruction cache.

9. The method of claim 1, wherein the portion is not copied by the CPU or read by the CPU from a memory of the EP outside of the PCIe controller of the EP to the instruction cache.

10. The method of claim 1, wherein the EP does not store an entirety of the boot software during execution of the portion.

11. A system comprising:

a PCIe bus;

a root complex (RC);

a PCIe endpoint (EP);

wherein the RC and EP are in communication via the PCIe bus;

wherein the EP is arranged to set a program counter of a central processing unit (CPU) of the PCIe EP to an address indicative of an address of memory of the RC which stores the boot software to execute; perform a memory transaction via the PCIe bus to read a portion of the boot software stored in the address of the memory of the RC which stores the boot software; receive, by the CPU, the portion which is read from the memory of the RC via the PCIe bus and PCIe controller of the EP, store, by the CPU, the portion in an instruction cache of the CPU; and execute, by the CPU of the PCIe EP, an instruction of the portion of the boot software that is received.

12. The system of claim 11, wherein the address indicative of the address in the memory of the RC which stores the boot software is defined by an outbound window of the EP comprising addresses that correspond to a memory region of the memory of the RC which stores the boot software, the memory region defined by an inbound window of the RC.

13. The system of claim 12, wherein an EP configuration block (ECB) stored in memory of the EP defines addresses of the outbound window that correspond to the memory region of memory of the RC which stores the boot software, the ECB accessible to the RC by a base address register (BAR) of the EP.

14. The system of claim 13, wherein the ECB further defines an EP over the air (OTA) update status field for the EP to indicate to the RC to perform an OTA update of the boot software via the field.

15. The system of claim 13, wherein the PCIe EP is further arranged to execute configuration software to set up the ECB in the memory of the EP after reset of the EP.

16. The system of claim 13, wherein the RC is arranged to write a base address and window size of the addresses to the ECB after storing the boot software in a volatile memory of the memory of the RC.

17. The system of claim 12, wherein the RC is arranged to determine an address in an inbound window of the RC which corresponds to the address of the addresses in the outbound window of the EP and the memory region of the memory of the RC which stores the boot software; and access the address in the inbound window of the RC to read the portion of the boot software in the memory region.

18. The system of claim 11, wherein the portion is not stored in a memory of the EP outside of the PCIe controller of the EP and then transferred to the instruction cache.

19. The system of claim 11, wherein the portion is not copied by the CPU or read by the CPU from a memory of the EP outside of the PCIe controller of the EP to the instruction cache.

20. The system of claim 11, wherein the EP does not store an entirety of the boot software during execution of the portion.

* * * * *